US010491804B2

United States Patent
Du et al.

(10) Patent No.: US 10,491,804 B2
(45) Date of Patent: Nov. 26, 2019

(54) FOCUS WINDOW DETERMINING METHOD, APPARATUS, AND DEVICE

(71) Applicant: Huawei Technologies Co., Ltd., Shenzhen (CN)

(72) Inventors: Cheng Du, Beijing (CN); Wei Luo, Shanghai (CN); Xin Guo, Beijing (CN); Huaiyang Rong, Shenzhen (CN); Jin Wu, Shenzhen (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 0 days.

(21) Appl. No.: 16/090,444

(22) PCT Filed: Mar. 29, 2016

(86) PCT No.: PCT/CN2016/077734
§ 371 (c)(1),
(2) Date: Oct. 1, 2018

(87) PCT Pub. No.: WO2017/166076
PCT Pub. Date: Oct. 5, 2017

(65) Prior Publication Data
US 2019/0208131 A1    Jul. 4, 2019

(51) Int. Cl.
*H04N 5/232*    (2006.01)

(52) U.S. Cl.
CPC ... *H04N 5/232123* (2018.08); *H04N 5/23219* (2013.01); *H04N 5/232127* (2018.08)

(58) Field of Classification Search
CPC ......... H04N 5/232123; H04N 5/23219; H04N 5/232127; H04N 5/232; G02B 27/08; G03B 13/36; G03B 3/00
See application file for complete search history.

(56) References Cited

U.S. PATENT DOCUMENTS

| 8,760,567 B2 | 6/2014 | Hamamura |
| 8,792,006 B2 | 7/2014 | Lee |

(Continued)

FOREIGN PATENT DOCUMENTS

| CN | 101149462 A | 3/2008 |
| CN | 101806949 A | 8/2010 |

(Continued)

OTHER PUBLICATIONS

Machine Translation and Abstract of Chinese Publication No. CN101149462, Mar. 26, 2008, 27 pages.

(Continued)

*Primary Examiner* — Hung H Lam
(74) *Attorney, Agent, or Firm* — Conley Rose, P.C.

(57) ABSTRACT

A method includes determining to set a face area as a current focus window when a face is detected in a to-be-photographed image, detecting a preset location in the face area, adjusting a width of the current focus window according to the preset location in the face area, stretching a length of the current focus window according to at least a first preset ratio and a second preset ratio, calculating at least a contrast value of an image in the first focus window and a contrast value of an image in the second focus window, and determining a final focus window according to the at least two contrast values. Therefore, the width of the focus window is reduced such that the focus window is without background content.

8 Claims, 16 Drawing Sheets

(56) References Cited

U.S. PATENT DOCUMENTS

| | | |
|---|---|---|
| 2007/0064145 A1 | 3/2007 | Sugimoto |
| 2008/0074529 A1 | 3/2008 | Terashima |
| 2008/0193115 A1* | 8/2008 | Uenishi ............... G02B 7/08 396/123 |
| 2009/0322934 A1* | 12/2009 | Ishii ............... G03B 13/36 348/345 |
| 2010/0002128 A1* | 1/2010 | Ishii ............... G03B 3/00 348/349 |
| 2010/0208091 A1 | 8/2010 | Chang |
| 2010/0208126 A1 | 8/2010 | Uenishi |
| 2010/0209094 A1* | 8/2010 | Uehara ............... G02B 27/28 396/125 |
| 2011/0013044 A1* | 1/2011 | Steinberg ............... G06T 5/00 348/222.1 |
| 2013/0135518 A1 | 5/2013 | Uehara |
| 2013/0155276 A1 | 6/2013 | Ueda |
| 2013/0321587 A1 | 12/2013 | Kim |
| 2014/0362278 A1 | 12/2014 | Kawarada |
| 2018/0343383 A1 | 11/2018 | Ito et al. |

FOREIGN PATENT DOCUMENTS

| | | |
|---|---|---|
| CN | 101808197 A | 8/2010 |
| CN | 101950063 A | 1/2011 |
| CN | 103858043 A | 6/2014 |
| CN | 104243802 A | 12/2014 |
| CN | 104243825 A | 12/2014 |
| CN | 104270562 A | 1/2015 |
| CN | 105210018 A | 12/2015 |
| CN | 105357444 A | 2/2016 |
| CN | 105872363 A | 8/2016 |

OTHER PUBLICATIONS

Machine Translation and Abstract of Chinese Publication No. CN101950063, Jan. 19, 2011, 9 pages.
Machine Translation and Abstract of Chinese Publication No. CN104243802, Dec. 24, 2014, 21 pages.
Machine Translation and Abstract of Chinese Publication No. CN105872363, Aug. 17, 2016, 19 pages.
Foreign Communication From a Counterpart Application, Chinese Application No. 201680013196.5, Chinese Office Action dated Mar. 26, 2019, 5 pages.
Wikipedia, "Autofocus," XP055549767, Nov. 6, 2015, 9 pages.
Foreign Communication From a Counterpart Application, European Application No. 16895857.7, Partial Supplementary European Search Report dated Feb. 7, 2019, 14 pages.
Machine Translation and Abstract of Chinese Publication No. CN104243825, Dec. 24, 2014, 13 pages.
Machine Translation and Abstract of Chinese Publication No. CN104270562, Jan. 7, 2015, 16 pages.
Machine Translation and Abstract of Chinese Publication No. CN105357444, Feb. 24, 2016, 27 pages.
Foreign Communication From a Counterpart Application, PCT Application No. PCT/CN2016/077734, English Translation of International Search Report dated Jul. 4, 2016, 3 pages.
Foreign Communication From a Counterpart Application, PCT Application No. PCT/CN2016/077734, English Translation of Written Opinion dated Jul. 4, 2016, 6 pages.

* cited by examiner

Input picture        Saliency detection result

FOCUS WINDOW DETERMINING METHOD, APPARATUS, AND DEVICE

CROSS REFERENCE TO RELATED APPLICATIONS

This application is a U.S. National Stage of International Patent Application No. PCT/CN2016/077734 filed on Mar. 29, 2016, which is hereby incorporated by reference in its entirety.

TECHNICAL FIELD

The present invention relates to the field of digital image technologies, and in particular, to a focus window determining method, apparatus, and device.

BACKGROUND

Automatic focus means to control a distance from a voice coil motor (Voice Coil Motor, VCM) to an image sensor by using an auto-focus algorithm, so that a subject of a to-be-photographed object is clearest.

Common auto-focus algorithms may be classified into two types: an active focus algorithm, that is, a ranging method, and a passive focus algorithm, that is, a hill climbing method.

In the ranging method, a distance from a to-be-photographed subject to a lens, that is, an object distance, is measured by using a method such as infrared ranging, ultrasonic ranging, or binocular stereoscopic vision, a VCM position corresponding to the object distance is calculated, and the VCM position is adjusted to obtain an in-focus image. The ranging method is characterized by a relatively fast focusing speed, but an additional ranging module is required. Therefore, costs are high, and a relatively high precision requirement is imposed on the ranging module. As shown in FIG. 1, a VCM position corresponding to a measured object distance is calculated according to the object distance, and an in-focus location in the case of an optimal contrast (contrast) is directly determined, to obtain an in-focus image.

In the hill climbing method, a VCM position is changed to obtain images corresponding to different VCM positions, and a contrast of the images and a contrast changing trend are analyzed, to find a VCM position in the case of an optimal contrast, and obtain an in-focus image. The hill climbing method is characterized by a relatively low focusing speed, but relatively low costs and relatively high focusing precision. As shown in FIG. 2, a VCM position corresponding to an optimal contrast is determined by means of analysis to complete focus, to obtain an in-focus image.

However, when the hill climbing method is used for focusing, a travelling range of all VCMs is usually not searched for, but instead, the first found peak value in a contrast curve is determined as an in-focus location, to quickly obtain an in-focus image. However, in some scenarios, such as a macro scenario, some objects in a focus window are quite close to a lens, and some objects are quite far away from the lens. In this case, the contrast curve is a curve with two peaks, and consequently, a focus result may be a background part in image content, and an ideal in-focus image cannot be obtained.

For example, as shown in FIG. 3, in a macro scenario, there is a double-peak contrast curve shown in the figure. Due to different VCM positions, the contrast curve has a peak value at a closer location of a flower that is corresponding to a black focus window, and has a second peak value at a location of a remote hill that is corresponding to a white focus window.

For another example, in focusing performed by using the hill climbing method, a central area in a previewed picture is usually selected as a focus window, but sometimes the central area is not an area that a user expects to focus. Therefore, focusing performed by using a central focus window may lead to out-of-focus, and an ideal in-focus image cannot be obtained.

In addition, for focusing of a flat area, for example, in a flat area scenario such as sky, there is no object with obvious rich texture in a focus window, and there is no obvious contrast curve peak value in a motor travelling range. Therefore, it may be difficult to find an in-focus location, even out-of-focus is caused, and consequently, an ideal in-focus image cannot be obtained. Likewise, in a face focus scenario, a face area is not an area of extremely rich texture either. If focusing is performed only by using the face area, an in-focus location that is eventually determined may be not accurate enough either because a peak in a contrast curve is not sharp enough. In addition, image noise or movement of a photographed person or a camera device in a focus process greatly affects determining of a peak value in the contrast curve. For example, as shown in FIG. 4, image content is a sky scenario. A contrast curve corresponding to this image is quite flat, and it is difficult to determine an accurate peak value. Consequently, an in-focus location that is eventually determined may be incorrect, and an ideal in-focus image cannot be obtained.

In conclusion, in a process of automatic focus performed by using the hill climbing method, in different photographing scenarios, because a focus window search range is limited, or texture of image content in a focus window is not rich enough, it may be difficult to find an in-focus location, even out-of-focus is caused, and consequently, an ideal in-focus image cannot be obtained.

SUMMARY

Embodiments of the present invention are to provide a focus window determining method, apparatus, and device, to resolve a problem that during automatic focus performed by using a hill climbing method, it is difficult to find an in-focus location, even out-of-focus is caused, and consequently, an ideal in-focus image cannot be obtained.

The embodiments of the present invention are implemented by using the following technical solutions.

According to a first aspect, a focus window determining method is provided, including: when a face is detected in a to-be-photographed image, determining to use a face area as a current focus window; detecting a preset location in the face area, and adjusting a width of the current focus window according to the preset location in the face area; stretching a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window; calculating at least a contrast value of an image in the first focus window and a contrast value of an image in the second focus window; and determining a final focus window according to the at least two contrast values.

Therefore, according to the foregoing focus window determining method, the width of the focus window is reduced, so that the focus window includes no background content; the focus window is stretched to a human body part, so that texture richness of the focus window can be improved, and further a focus effect in a face focus process is effectively improved.

With reference to the first aspect, in a first possible implementation of the first aspect, the detecting a preset location in the face area, and adjusting a width of the current focus window according to the preset location in the face area includes: detecting locations of eyes or locations of eyebrows in the face area, and adjusting the width of the current focus window to a distance between the eyes or a distance between the eyebrows in the face area.

With reference to the first aspect or the first possible implementation, in a second possible implementation, the determining a final focus window according to the at least two contrast values includes: using a focus window corresponding to a largest contrast value as the final focus window according to the at least two contrast values.

According to a second aspect, a focus window determining method is provided, including: determining that an image in a current focus window is a flat area, where the flat area means that a contrast value of the image in the current focus window is less than a first threshold; enlarging the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window; calculating at least a contrast value of an image in the first focus window and a contrast value of an image in the second focus window; and determining a final focus window according to the at least two contrast values.

Therefore, according to the foregoing focus window determining method, after it is determined according to a contrast value of the image in the focus window that the image in the current focus window is a flat area, the focus window is enlarged, until the focus window includes sufficient texture areas, so that a focus effect is effectively improved.

With reference to the second aspect, in a first possible implementation of the second aspect, the determining a final focus window according to the at least two contrast values includes: using a focus window corresponding to a largest contrast value as the final focus window according to the at least two contrast values; or using a focus window whose contrast value is greater than a second threshold and that is corresponding to a smallest preset ratio as the final focus window according to the at least two contrast values, where the second threshold is greater than the first threshold.

According to a third aspect, a focus window determining method is provided, including: determining that a photographing mode used by a camera to photograph a to-be-photographed image is a macro mode, and enabling dual focus windows, where the dual focus windows include a first focus window and a second focus window, a size of the second focus window is less than a size of the first focus window, and the second focus window is in the first focus window; and when it is determined, in a moving process of a motor of the camera, that a contrast value of an image in the first focus window decreases from a first peak value and a contrast value of an image in the second focus window decreases from a second peak value, using the first focus window as a final focus window, where the first peak value is a peak value in a contrast curve corresponding to the image in the first focus window, and the second peak value is a peak value in a contrast curve corresponding to the image in the second focus window.

Therefore, according to the foregoing focus window determining method, out-of-focus easily caused when a focus window includes objects of different depths of field can be effectively avoided.

An embodiment of the present invention further provides a focus window determining method, including: analyzing a to-be-photographed image according to a saliency detection technology, and automatically detecting a salient area; and when it is determined that there is a salient area in the to-be-photographed image, placing a focus window in the salient area.

Therefore, according to the foregoing focus window determining method, out-of-focus that is caused when a focus area is not a focus area expected by a user can be resolved.

According to a fourth aspect, a focus window determining apparatus is provided, including: a determining unit, configured to: when a face is detected in a to-be-photographed image, determine to use a face area as a current focus window; a detection unit, configured to detect a preset location in the face area, and adjust a width of the current focus window according to the preset location in the face area; an adjustment unit, configured to stretch a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window; a calculation unit, configured to calculate at least a contrast value of an image in the first focus window and a contrast value of an image in the second focus window; and an analysis unit, configured to determine a final focus window according to the at least two contrast values.

With reference to the fourth aspect, in a first possible implementation of the fourth aspect, when detecting the preset location in the face area, and adjusting the width of the current focus window according to the preset location in the face area, the detection unit is specifically configured to: detect locations of eyes or locations of eyebrows in the face area, and adjust the width of the current focus window to a distance between the eyes or a distance between the eyebrows in the face area.

With reference to the fourth aspect or the first possible implementation of the fourth aspect, in a second possible implementation, when determining the final focus window according to the at least two contrast values, the analysis unit is specifically configured to use a focus window corresponding to a largest contrast value as the final focus window according to the at least two contrast values.

According to a fifth aspect, a focus window determining apparatus is provided, including: a determining unit, configured to determine that an image in a current focus window is a flat area, where the flat area means that a contrast value of the image in the current focus window is less than a first threshold; an adjustment unit, configured to enlarge the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window; a calculation unit, configured to calculate at least a contrast value of an image in the first focus window and a contrast value of an image in the second focus window; and an analysis unit, configured to determine a final focus window according to the at least two contrast values.

With reference to the fifth aspect, in a first possible implementation of the fifth aspect, when determining the final focus window according to the at least two contrast values, the analysis unit is specifically configured to: use a focus window corresponding to a largest contrast value as the final focus window according to the at least two contrast values; or use a focus window whose contrast value is greater than a second threshold and that is corresponding to a smallest preset ratio as the final focus window according to the at least two contrast values, where the second threshold is greater than the first threshold.

According to a sixth aspect, a focus window determining apparatus is provided, including: a determining unit, configured to: determine that a photographing mode used by a camera to photograph a to-be-photographed image is a macro mode, and enable dual focus windows, where the dual focus windows include a first focus window and a second focus window, a size of the second focus window is less than a size of the first focus window, and the second focus window is in the first focus window; and an analysis unit, configured to: when it is determined, in a moving process of a motor of the camera, that a contrast value of an image in the first focus window decreases from a first peak value and a contrast value of an image in the second focus window decreases from a second peak value, use the first focus window as a final focus window, where the first peak value is a peak value in a contrast curve corresponding to the image in the first focus window, and the second peak value is a peak value in a contrast curve corresponding to the image in the second focus window.

According to a seventh aspect, a focus window determining device is provided, including a camera, a processor, and a memory, where the camera, the processor, and the memory are connected by using a bus; the memory is configured to store program code to be executed by the processor; and the processor is configured to perform the following operations by using the program code in the memory: when a face is detected in a to-be-photographed image, determining to use a face area as a current focus window; detecting a preset location in the face area, and adjusting a width of the current focus window according to the preset location in the face area; stretching a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window; calculating at least a contrast value of an image in the first focus window and a contrast value of an image in the second focus window; and determining a final focus window according to the at least two contrast values.

With reference to the seventh aspect, in a first possible implementation of the seventh aspect, when detecting the preset location in the face area, and adjusting the width of the current focus window according to the preset location in the face area, the processor is configured to perform the following operations by using the program code in the memory: detecting locations of eyes or locations of eyebrows in the face area, and adjusting the width of the current focus window to a distance between the eyes or a distance between the eyebrows in the face area.

With reference to the seventh aspect or the first possible implementation of the seventh aspect, in a second possible implementation, when determining the final focus window according to the at least two contrast values, the processor is configured to perform the following operation by using the program code in the memory: using a focus window corresponding to a largest contrast value as the final focus window according to the at least two contrast values.

According to an eighth aspect, a focus window determining device is provided, including a camera, a processor, and a memory, where the camera, the processor, and the memory are connected by using a bus; the memory is configured to store program code to be executed by the processor; and the processor is configured to perform the following operations by using the program code in the memory: determining that an image in a current focus window is a flat area, where the flat area means that a contrast value of the image in the current focus window is less than a first threshold; enlarging the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window; calculating at least a contrast value of an image in the first focus window and a contrast value of an image in the second focus window; and determining a final focus window according to the at least two contrast values.

With reference to the eighth aspect, in a first possible implementation of the eighth aspect, when determining the final focus window according to the at least two contrast values, the processor is configured to perform the following operation by using the program code in the memory: using a focus window corresponding to a largest contrast value as the final focus window according to the at least two contrast values; or using a focus window whose contrast value is greater than a second threshold and that is corresponding to a smallest preset ratio as the final focus window according to the at least two contrast values, where the second threshold is greater than the first threshold.

According to a ninth aspect, a focus window determining device is provided, including a camera, a processor, and a memory, where the camera, the processor, and the memory are connected by using a bus; the memory is configured to store program code to be executed by the processor; and the processor is configured to perform the following operations by using the program code in the memory: determining that a photographing mode used by a camera to photograph a to-be-photographed image is a macro mode, and enabling dual focus windows, where the dual focus windows include a first focus window and a second focus window, a size of the second focus window is less than a size of the first focus window, and the second focus window is in the first focus window; and when it is determined, in a moving process of a motor of the camera, that a contrast value of an image in the first focus window decreases from a first peak value and a contrast value of an image in the second focus window decreases from a second peak value, using the first focus window as a final focus window, where the first peak value is a peak value in a contrast curve corresponding to the image in the first focus window, and the second peak value is a peak value in a contrast curve corresponding to the image in the second focus window.

According to a tenth aspect, an embodiment of the present invention provides a computer storage medium, to store a computer software instruction used by the foregoing focus window determining device, and the computer storage medium includes a program designed for performing the foregoing aspects.

In the embodiments of the present invention, when the face is detected in the to-be-photographed image, it is determined to use the face area as the current focus window, the preset location in the face area is detected, and the width of the current focus window is adjusted according to the preset location in the face area. Herein, the width of the focus window is reduced, so that there is no background content in the focus window. The length of the current focus window is stretched according to at least the first preset ratio and the second preset ratio. Herein, the focus window is stretched to a human body part, so that texture richness of the focus window can be improved, and further the focus effect in the face focus process is effectively improved. Finally, at least the contrast value of the image in the first focus window and the contrast value of the image in the second focus window are calculated, and the final focus window is determined according to the at least two contrast values.

In the embodiments of the present invention, it is determined that the image in the current focus window is a flat area, the current focus window is enlarged according to at least the first preset ratio and the second preset ratio, and at least the contrast value of the image in the first focus window and the contrast value of the image in the second focus window are calculated. Herein, the focus window is enlarged until the focus window includes sufficient texture areas, so that a focus effect can be improved. Finally, the final focus window is determined according to the at least two contrast values.

In the embodiments of the present invention, it is determined that the photographing mode used by the camera to photograph the to-be-photographed image is the macro mode, and the dual focus windows are enabled; and when it is determined, in the moving process of the motor of the camera, that the contrast value of the image in the first focus window decreases from the first peak value and the contrast value of the image in the second focus window decreases from the second peak value, the first focus window is used as the final focus window, so that out-of-focus caused when the focus window includes objects of different depths of field can be effectively avoided.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
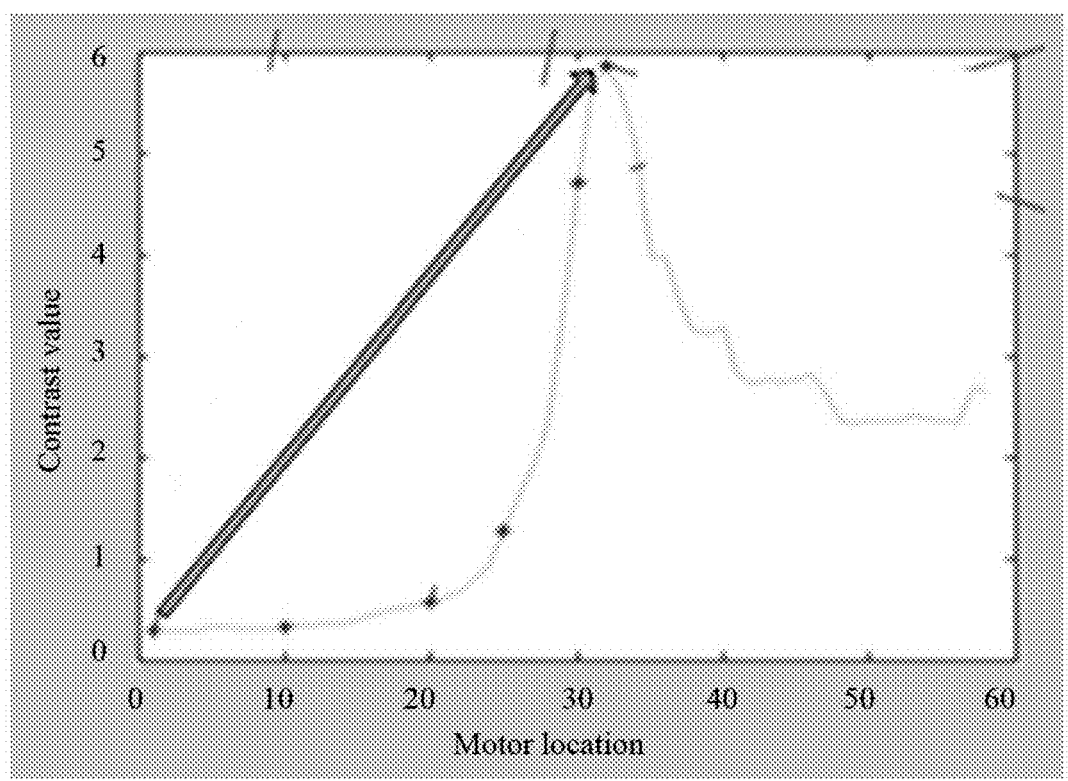
FIG. 1 is a principle diagram of automatic focus performed by using a ranging method in the background of the present invention.
Figure 2:
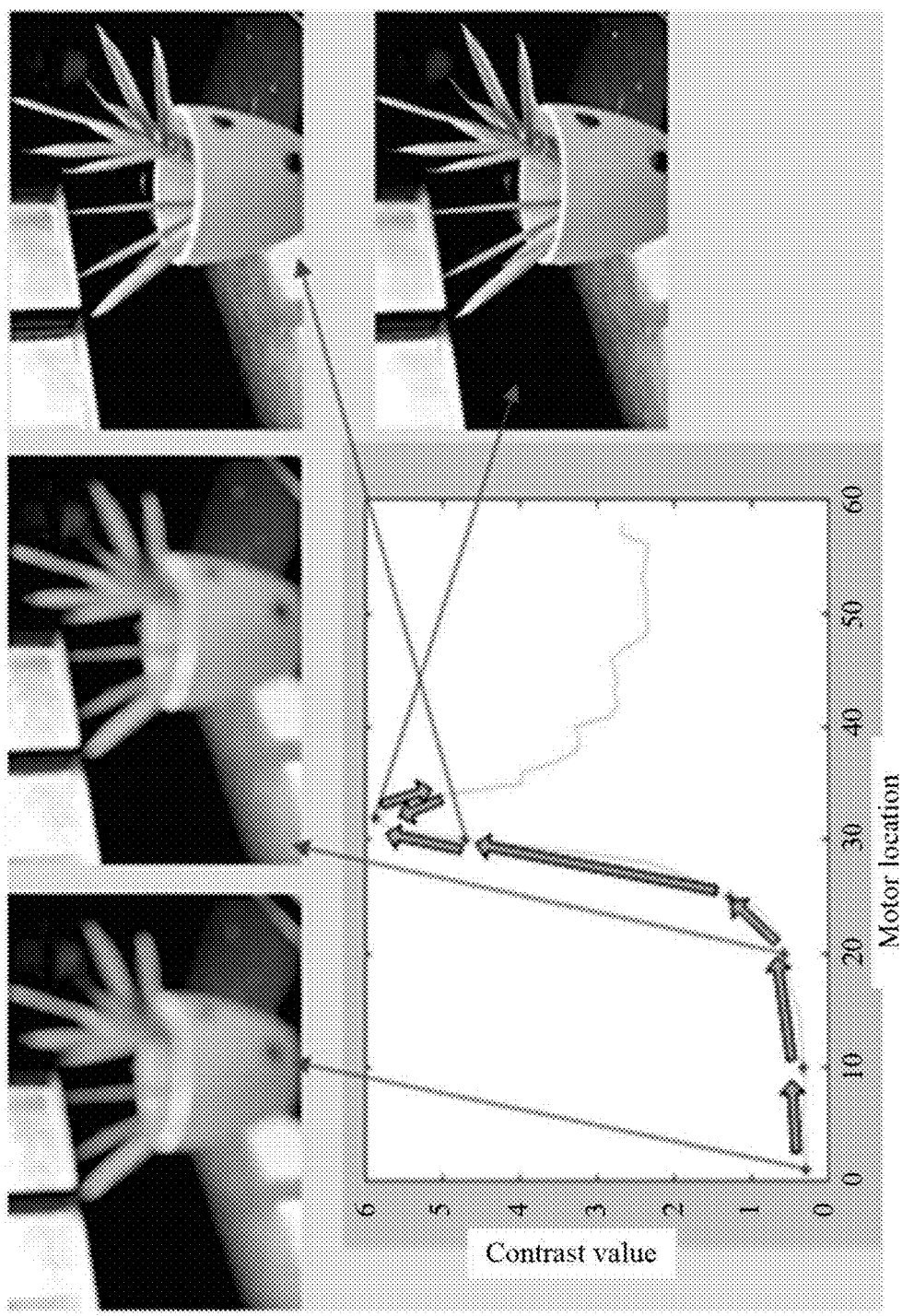
FIG. 2 is a principle diagram of automatic focus performed by using a hill climbing method in the background of the present invention.
Figure 3:
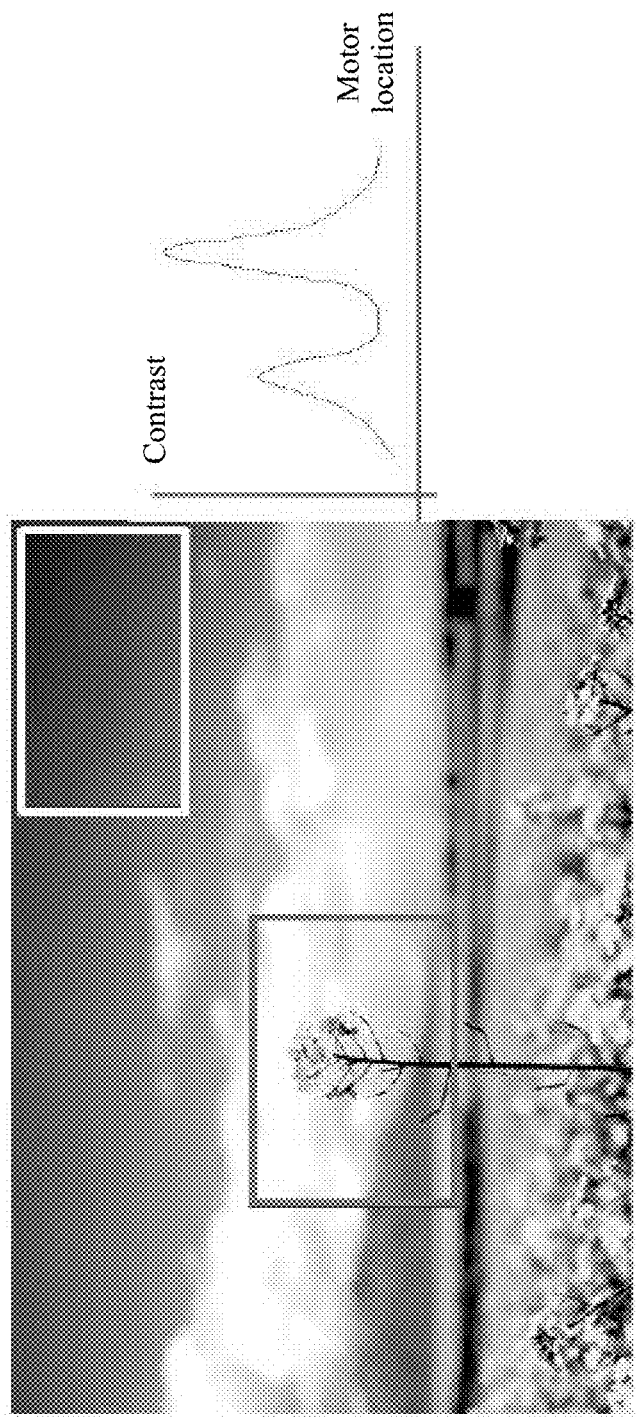
FIG. 3 is a schematic diagram of automatic focus performed in a macro scenario in the background of the present invention.
Figure 4:
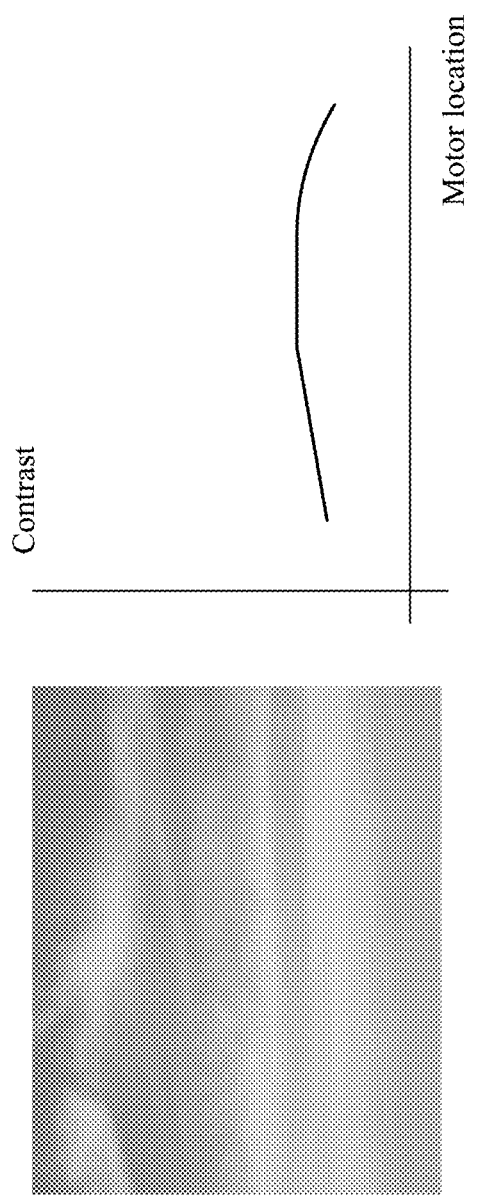
FIG. 4 is a schematic diagram of automatic focus performed in a flat area scenario in the background of the present invention.
Figure 5:
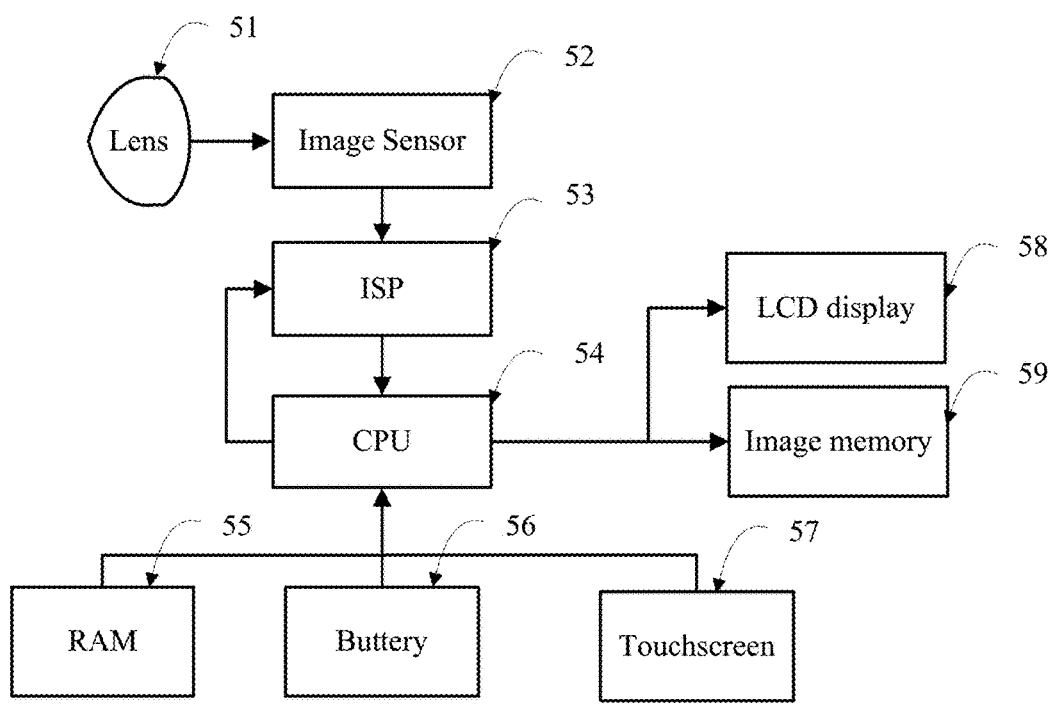
FIG. 5 is a schematic structural diagram of a terminal camera device according to an embodiment of the present invention.

Referring to FIG. 5, FIG. 5 is a schematic structural diagram of a terminal camera device according to an embodiment of the present invention. FIG. 5 includes a lens 51, an image sensor (Image Sensor) 52, an image processor (Image Signal Processor, ISP) 53, a central processing unit (Central Processing Unit, CPU) 54, a random access memory (random access memory, RAM) 55, a buttery 56, a touchscreen 57, a liquid crystal display (Liquid Crystal Display, LCD) 58, and an image memory 59.

This embodiment of the present invention provides software used to improve an auto-focus effect, and the software may be a functional module on the ISP or the CPU.

Figure 6:
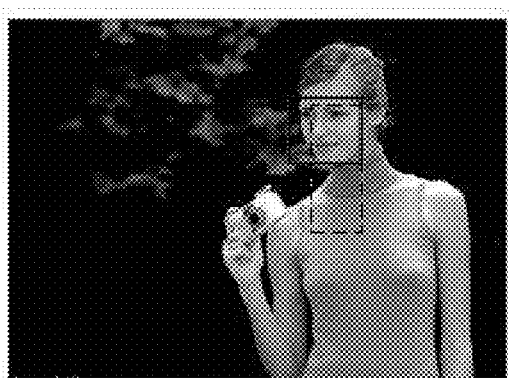
FIG. 6 is a schematic diagram of determining a focus window for a face area according to an embodiment of the present invention.

In the prior art, as shown in FIG. 6, an auto-focus apparatus usually automatically selects a largest face area as a focus window according to a face detection result. However, in this case, the face detection result usually includes some background areas, such as a focus window shown by a solid-line box in the figure. Because the face area is usually an area in which texture is not rich enough, a contrast curve is prone to flatness. In addition, when a camera shakes or there is relatively much noise, out-of-focus is more easily caused, and an ideal in-focus image cannot be obtained. Therefore, if a background area includes a strong texture area in this case, a contrast curve has a contrast peak at a VCM position in a corresponding background area, and out-of-focus is caused.

Figure 7:
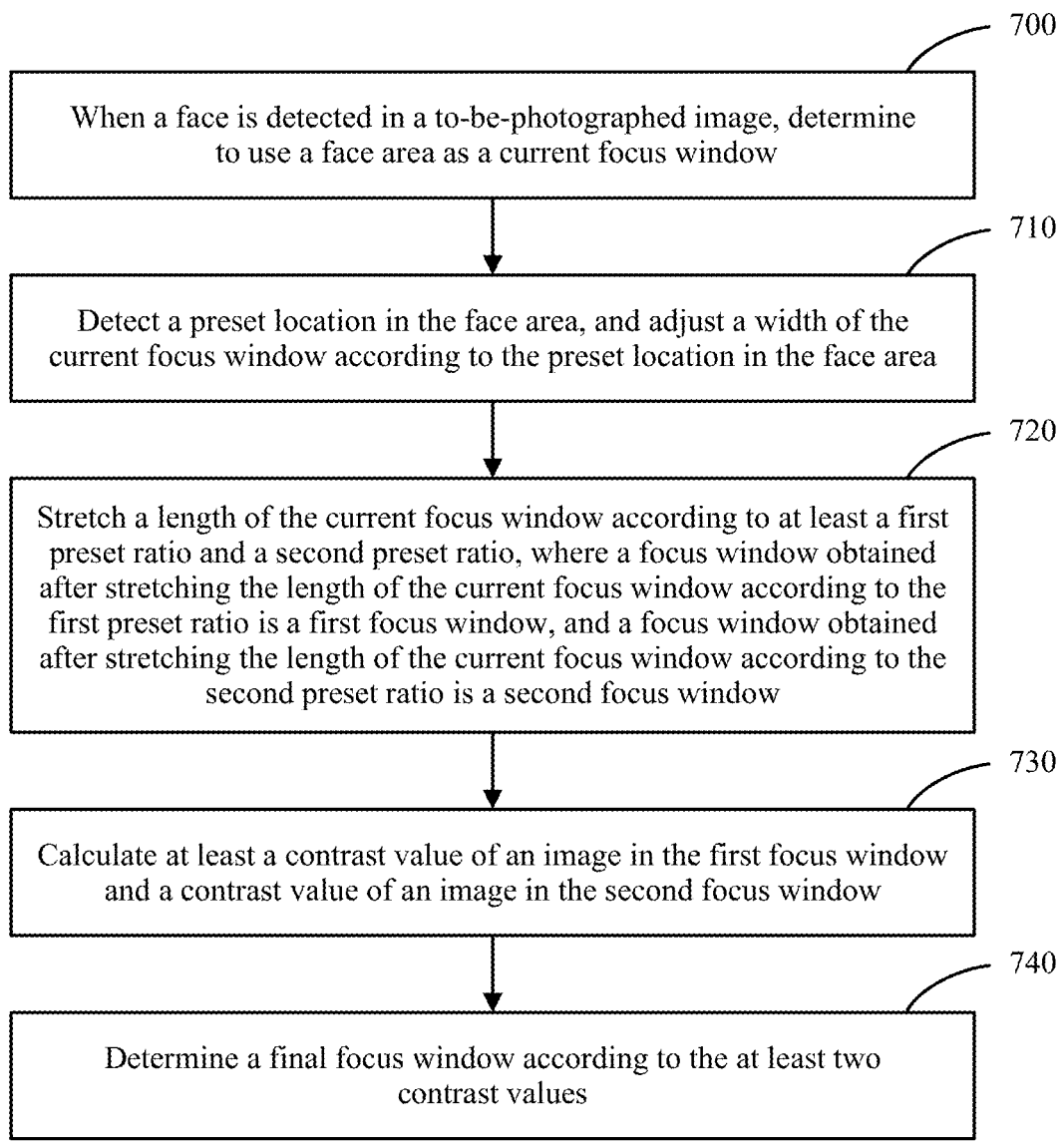
FIG. 7 is a first flowchart of an overview of focus window determining according to an embodiment of the present invention.

Referring to FIG. 7, an embodiment of the present invention provides a focus window determining method. According to the method provided in this embodiment of the present invention, face focus can be optimized.

The method includes the following steps.

Step 700: When a face is detected in a to-be-photographed image, determine to use a face area as a current focus window.

Optionally, a face detection module previews the to-be-photographed image, determines, by means of analysis, whether there is a face area in the image, and may automatically select a largest face area as the current focus window when determining there is a face area.

Step 710: Detect a preset location in the face area, and adjust a width of the current focus window according to the preset location in the face area.

Optionally, locations of eyes or locations of eyebrows in the face area are detected, and the width of the current focus window is adjusted to a distance between the eyes or a distance between the eyebrows in the face area.

Herein, the width of the current focus window is adjusted, mainly to reduce the width of the focus window, so that the focus window includes as little image content of different depths of field as possible, that is, the current focus window had better include no background content any longer.

Step 720: Stretch a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window.

Step 730: Calculate at least a contrast value of an image in the first focus window and a contrast value of an image in the second focus window.

It should be noted that the contrast value of the image in the first focus window is a first peak value in a contrast curve corresponding to the image in the first focus window, and the contrast value of the image in the second focus window is a peak value in a contrast curve corresponding to the image in the second focus window.

Step 740: Determine a final focus window according to the at least two contrast values.

Optionally, during determining of the final focus window according to the at least two contrast values, a focus window corresponding to a largest contrast value is first determined as the final focus window.

According to the foregoing method in step 700 to step 740, out-of-focus easily caused during face focus can be effectively avoided. Descriptions are provided below by using a specific embodiment.

First, an auto-focus apparatus enables face detection for a to-be-photographed image.

Current mainstream methods used for face detection include a geometrical characteristic-based method, a complexion model-based method, a statistical theory-based method, and the like.

For example, the auto-focus apparatus first performs the face detection according to any one or a combination of the foregoing methods.

Then, after detecting a face, the auto-focus apparatus determines a face area as a current focus window.

For example, after detecting faces, the auto-focus apparatus automatically selects a largest face as the focus window.

Then, the auto-focus apparatus continues to detect a preset location in the face area, and adjust a width of the current focus window according to the detected preset location in the face area.

For example, the auto-focus apparatus further determines locations of eyes or eyebrows, and reduces the width of the focus frame to a width between the eyes or a width between the eyebrows.

Subsequently, the auto-focus apparatus stretches a length of the current focus window according to different preset ratios, calculates contrast values of images in focus windows corresponding to the different preset ratios, and determines a final focus window according to the obtained contrast values.

For example, considering that human clothing is usually a high texture area, the auto-focus apparatus drops the focus window down to a neck area, such as a focus window shown by dashed lines in FIG. 7, to improve sharpness of a contrast curve.

Optionally, the auto-focus apparatus may drop the focus window down to 1.2, 1.4, 1.6, 1.8, and 2 times of the original focus window length, calculates a contrast value corresponding to an image in a focus window corresponding to each dropdown multiple, and selects a focus window corresponding to a largest contrast value as the final focus window.

It should be noted that the contrast value herein is a peak value in a contrast curve corresponding to each focus window.

Therefore, according to the foregoing focus window determining method, the width of the focus window is reduced, so that the focus window includes no background content; the focus window is stretched to a human body part, so that texture richness of the focus window can be improved, and further a focus effect in a face focus process is effectively improved.

In the prior art, in a flat area scenario such as sky or a white wall, because image content has no rich texture, and is prone to be affected by noise or camera device shaking, it is difficult to find an in-focus location, and out-of-focus is caused.

Figure 8:
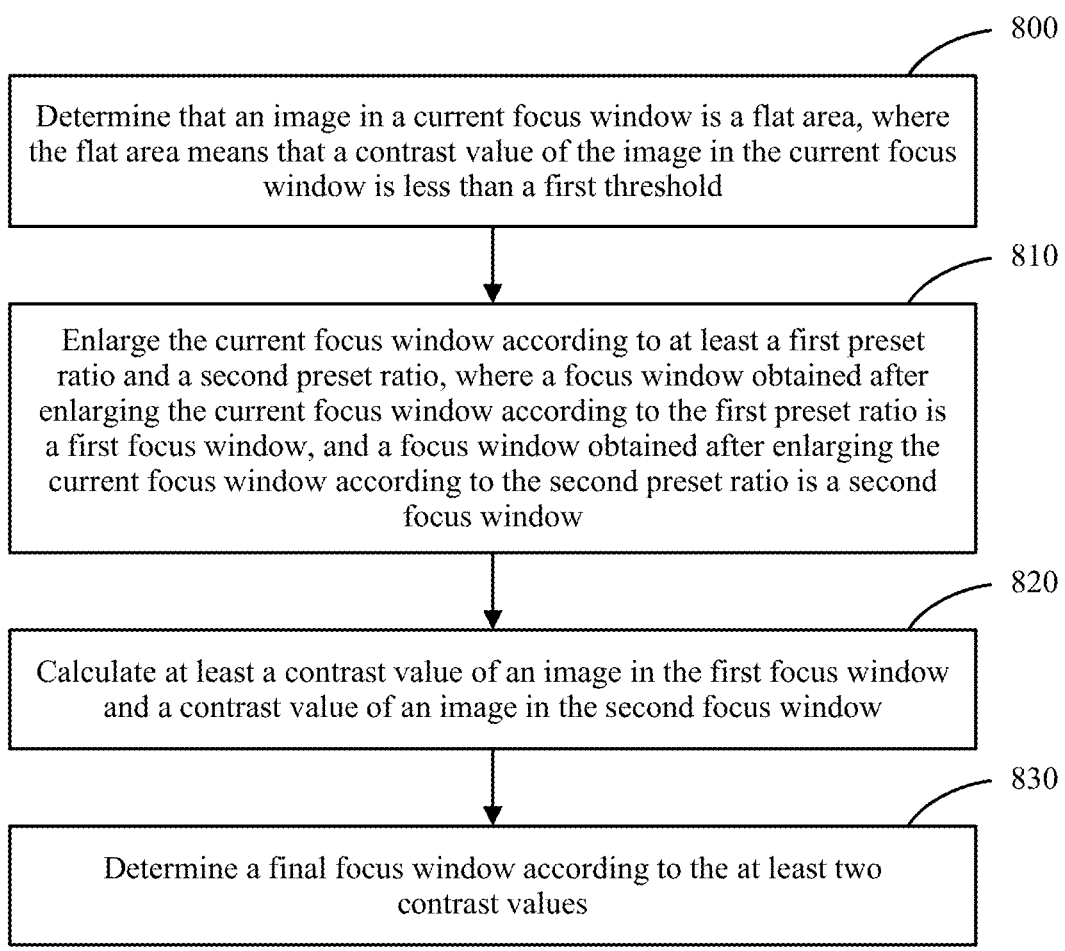
FIG. 8 is a second flowchart of an overview of focus window determining according to an embodiment of the present invention.

Referring to FIG. 8, an embodiment of the present invention provides a focus window determining method. According to the focus window determining method provided in this embodiment of the present invention, a problem that it is difficult to find an in-focus location in a flat area and even out-of-focus is caused can be effectively avoided.

The method includes the following steps.

Step 800: Determine that an image in a current focus window is a flat area, where the flat area means that a contrast value of the image in the current focus window is less than a first threshold.

Step 810: Enlarge the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window.

Step 820: Calculate at least a contrast value of an image in the first focus window and a contrast value of an image in the second focus window.

Step 830: Determine a final focus window according to the at least two contrast values.

Optionally, the final focus window may be determined according to the at least two contrast values by using, but without being limited to, the following two methods.

First method: A focus window corresponding to a largest contrast value is used as the final focus window according to the at least two contrast values.

Second method: A focus window whose contrast value is greater than a second threshold and that is corresponding to a smallest preset ratio is used as the final focus window according to the at least two contrast values, where the second threshold is greater than the first threshold.

According to the foregoing method in step 800 to step 830, out-of-focus easily caused during focus performed in a flat area scenario can be effectively avoided. Descriptions are provided below by using a specific embodiment.

First, an auto-focus apparatus determines that image content in a current focus window is a flat area.

The flat area means that a contrast value of an image in the current focus window is less than a first threshold.

For example, if the auto-focus apparatus determines that there is no face in to-be-photographed image content, it is assumed that the focus window is placed in a central area of the image content in a preset size at first, and it is determined whether the contrast value of the image in the focus window is less than the first threshold. If it is determined that the contrast value of the image in the current focus window is less than the first threshold, it is determined that the image in the current focus window is a flat area.

Then, the auto-focus apparatus enlarges the current focus window according to at least a first preset ratio and a second preset ratio, and calculates at least a contrast value of an image in a first focus window and a contrast value of an image in a second focus window. A focus window obtained after enlarging the current focus window according to the first preset ratio is the first focus window, and a focus window obtained after enlarging the current focus window according to the second preset ratio is the second focus window.

For example, the auto-focus apparatus enlarges the current focus window to 1.2, 1.4, 1.6, 1.8, and 2 times of the original focus window, and calculates a contrast value corresponding to each focus window. Herein, the focus window is enlarged, to improve texture intensity in the focus window.

Finally, the auto-focus apparatus determines a final focus window according to the at least two contrast values.

For example, the auto-focus apparatus enlarges the focus window to 1.2, 1.4, 1.6, 1.8, and 2 times of the original focus window, calculates contrast values of images in the five focus windows, and selects a smallest focus window whose contrast value is greater than a given threshold T1 as the final focus window.

For another example, the auto-focus apparatus enlarges the focus window to 1.2, 1.4, 1.6, 1.8, and 2 times of the original focus window, calculates contrast values of images in the five focus windows, and selects a focus window with a largest contrast value as the final focus window.

Figure 9:
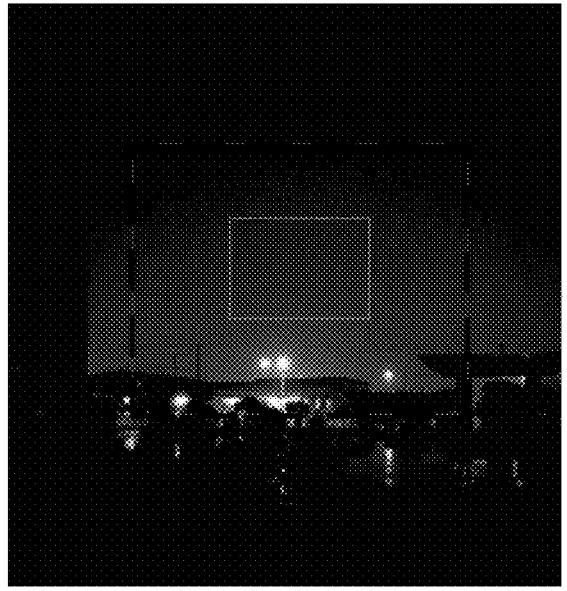
FIG. 9 is a schematic diagram of determining a focus window in a flat area scenario according to an embodiment of the present invention.

As shown in FIG. 9, an initial focus window is a focus window shown by white solid lines in the figure, and when it is determined that an image in the focus window is a flat area, the focus window is enlarged, for example, a focus window shown by black dashed lines in the figure. Therefore, texture intensity in image content in the focus window is improved, and a contrast value is increased.

Therefore, according to the method provided in this embodiment of the present invention, after it is determined according to a contrast value of the image in the focus window that the image in the current focus window is a flat area, the focus window is enlarged until the focus window includes sufficient texture areas, so that a focus effect is effectively improved.

Figure 10:
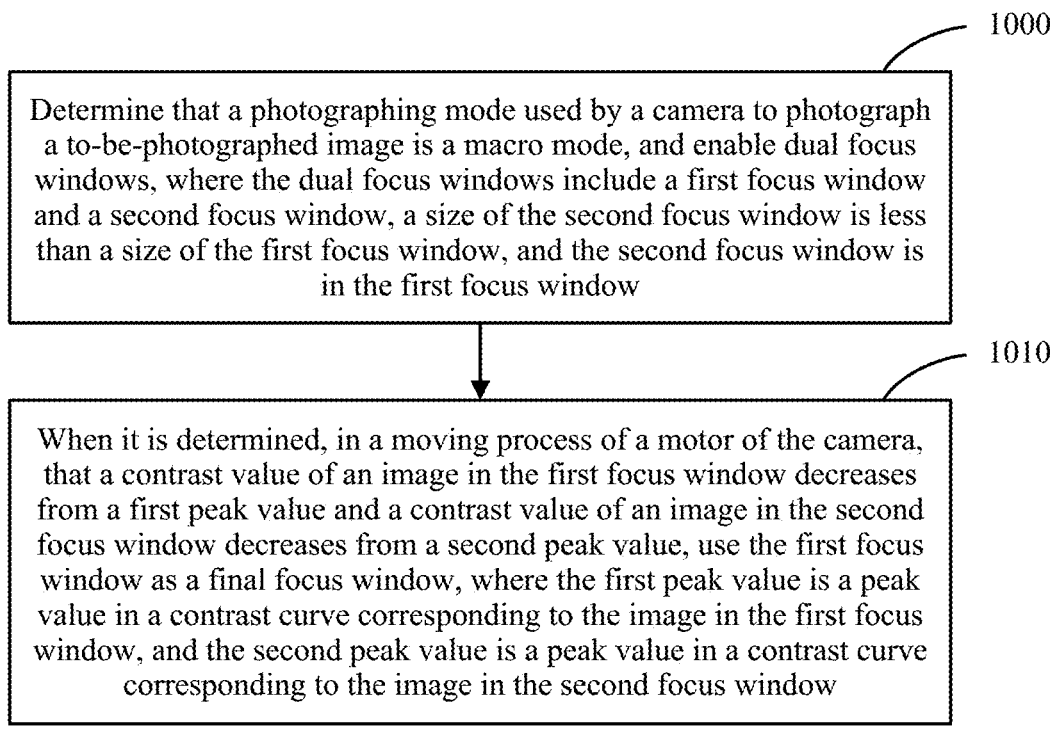
FIG. 10 is a third flowchart of an overview of focus window determining according to an embodiment of the present invention.

Referring to FIG. 10, in a focus process performed by using a hill climbing method, to avoid a case in which there are multiple peaks in a contrast curve because a focus window includes multiple depths of field, an embodiment of the present invention provides a focus window determining method, to avoid a case in which background is focused when a focus window includes objects of different depths of field.

The method includes the following steps.

Step 1000: Determine that a photographing mode used by a camera to photograph a to-be-photographed image is a macro mode, and enable dual focus windows, where the dual focus windows include a first focus window and a second focus window, a size of the second focus window is less than a size of the first focus window, and the second focus window is in the first focus window.

Step 1010: When it is determined, in a moving process of a motor of the camera, that a contrast value of an image in the first focus window decreases from a first peak value and a contrast value of an image in the second focus window decreases from a second peak value, use the first focus window as a final focus window, where the first peak value is a peak value in a contrast curve corresponding to the image in the first focus window, and the second peak value is a peak value in a contrast curve corresponding to the image in the second focus window.

Specifically, the first peak value and the second peak value are respectively corresponding to motor locations that fall within a preset motor range.

The first peak value and the second peak value are basically peak values corresponding to a same motor location, that is, the first peak value and the second peak value have a same horizontal coordinate.

This embodiment of the present invention provides a focus window determining method.

According to the foregoing method in step 1000 and step 1010, out-of-focus easily caused when a focus window includes objects of different depths of field can be effectively avoided. Descriptions are provided below by using a specific embodiment.

First, an auto-focus apparatus determines that a photographing mode used by a camera to photograph a to-be-photographed image is a macro mode.

In the prior art, for most digital camera devices, an object distance of 50 cm is usually a boundary between a macro mode and a regular mode. Therefore, an object distance within 50 cm is usually considered as a macro distance. In addition, the macro distance may be more accurately defined by using a magnification concept. If a height of a photographed object is X, and a height of an image on a film (a CCD or a CMOS) is Y, a magnification is Y:X, and a smaller one in a numerator or a denominator is usually reduced to 1, for example, 1:5 or 2:1. Generally, a magnification of a digital camera device is between 1:1 to 1:10, and belongs to a close-up macro photography range.

Then, the auto-focus apparatus enables dual focus windows. The dual focus windows include a first focus window and a second focus window, a size of the second focus window is less than a size of the first focus window, and the second focus window is in the first focus window.

Then, when determining, in a moving process of a VCM, that a contrast value of an image in the first focus window decreases from a first peak value and a contrast value of an image in the second focus window decreases from a second peak value, the auto-focus apparatus uses the first focus window as a final focus window.

In addition, if the contrast value of the image in the first focus window decreases from the first peak value, but the contrast value of the image in the second focus window still keeps a rising trend, it indicates that a focus result of the first focus window is currently on background of the to-be-photographed image.

Figure 11:
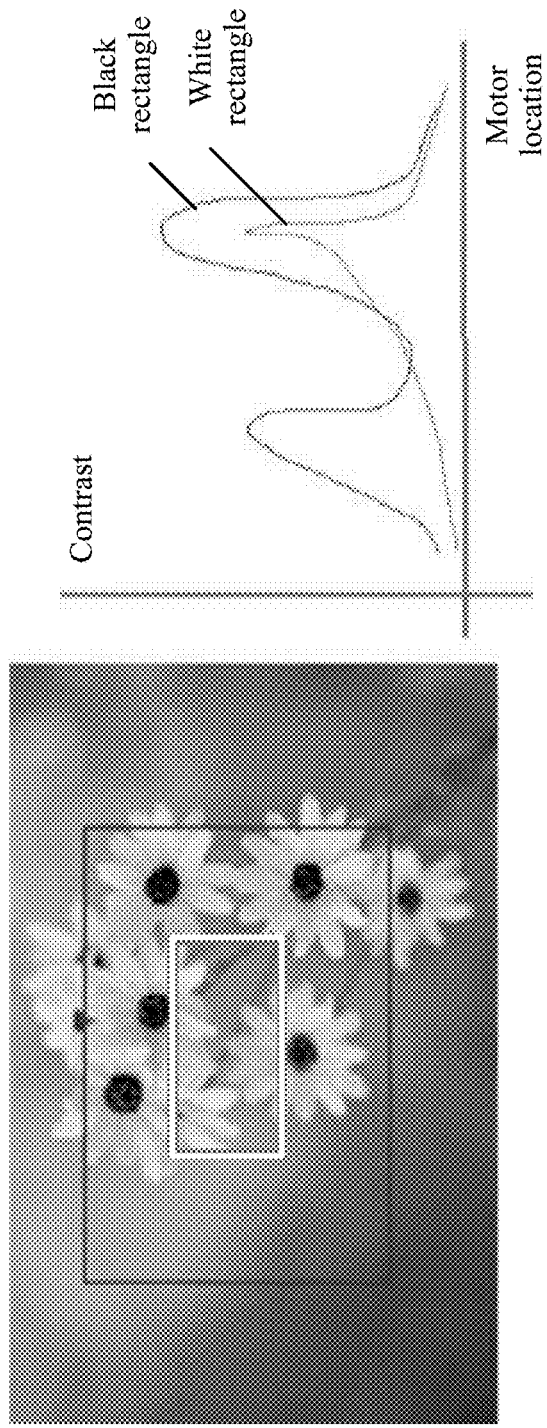
FIG. 11 is a schematic diagram of determining a focus window in a macro scenario according to an embodiment of the present invention.

As shown in FIG. 11, if it is found that a contrast curve of a primary focus window (a black rectangle) decreases in a moving process of a motor, a trend of a contrast curve of a secondary focus window (a white rectangle) is determined at the same time. If both the two curves decrease, and as shown in the figure, both the two curves have peak values at a same motor location, the primary focus window is determined as the final focus window.

Therefore, according to the method provided in this embodiment of the present invention, contrast values of two focus windows are calculated, and a correct in-focus location can be found only when both contrast curves respectively corresponding to the two focus windows start to decrease.

In addition, this embodiment of the present invention further provides a focus window determining method, to avoid out-of-focus that is caused when a focus area is not a focus area expected by a user.

First, an auto-focus apparatus analyzes a to-be-photographed image according to a saliency detection technology, and automatically detects a salient area.

Saliency detection is a well-known technology. Saliency detection is to find, in an image, an area that may attract visual attention of a person. A saliency model put forward by Ittihe Koch, et al is the most influential. According to the model, three feature graphs in terms of a highlight, a direction, and a color are extracted from an original image, to comprehensively determine feature information of each pixel in the entire image. Then a difference between the pixel and a pixel in a neighboring area is used as saliency of the pixel, a winner-take-all method in a neural network is applied to an extracted saliency diagram, and the extracted saliency diagram is used as a basis for shifting visual attention, to extract a salient area in an image.

Then, when determining that there is a salient area in the to-be-photographed image, the auto-focus apparatus places a focus window in the salient area.

Figure 12:
FIG. 12 is a first schematic principle diagram of saliency detection according to an embodiment of the present invention.
Figure 13:
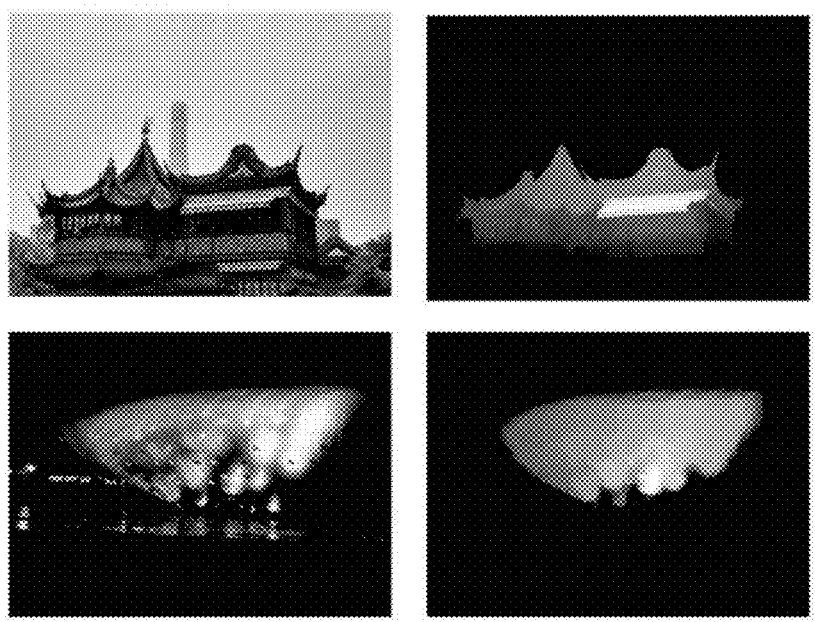
FIG. 13 is a second schematic principle diagram of saliency detection according to an embodiment of the present invention.

For example, when failing to perform face detection on current image content, the auto-focus apparatus runs a salient area detection algorithm, to detect whether there is a salient area in the image content. Referring to FIG. 12 and FIG. 13, FIG. 12 and FIG. 13 show salient areas determined by the auto-focus apparatus after running the salient area detection algorithm. Further, as shown in FIG. 12, a focus window is placed in the detected salient area.

Figure 14A:
FIG. 14A is a first schematic diagram of performing determining for a saliency detection result according to an embodiment of the present invention.
Figure 14B:
FIG. 14B is a second schematic diagram of performing determining for a saliency detection result according to an embodiment of the present invention.
Figure 15:
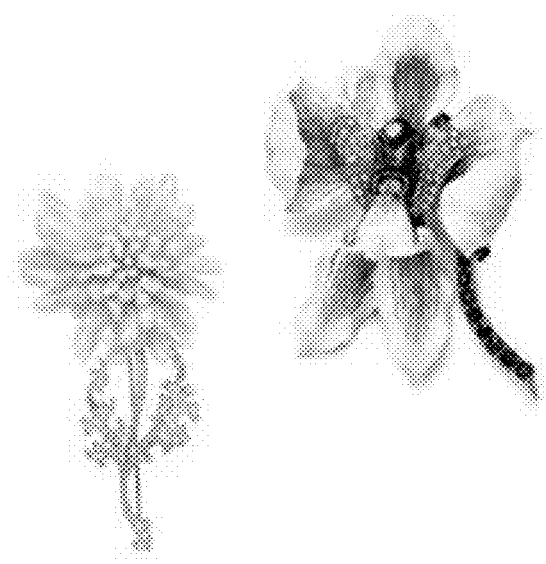
FIG. 15 is a schematic diagram of performing determining for a confidence of a saliency detection result according to an embodiment of the present invention.

Optionally, when running the salient area detection algorithm, the auto-focus apparatus may perform determining on a saliency detection result of a to-be-photographed image. For example, as shown in FIG. 14A, a saliency detection result is not centralized enough, and there are flowers on both sides in the figure. A saliency detection result in FIG. 14B is relatively centralized, and there is only one flower in a salient location. In addition, when a saliency detection result detected in image content is relatively centralized, a confidence threshold further needs to be greater than a preset confidence threshold. The threshold is a threshold used to describe a saliency degree. For example, as shown in FIG. 15, a color of a flower on the left of FIG. 15 is closer to a background color, and a saliency degree is lower; a color of a flower on the right has a higher saliency degree relative to the background color. In this case, an image on the right with a higher saliency degree may be selected as a salient area.

It is assumed that a focus window is placed in a central area of the to-be-photographed image in a preset size at first, when it is determined that a salient area is detected, the focus window is placed in the salient area, for example, a black focus window in FIG. 12. If a saliency detection result of the image content is relatively dispersed or has a relatively low confidence, a size and a location of the focus window remain unchanged.

Therefore, according to the method provided in this embodiment of the present invention, an area that is in a to-be-photographed image and in which a person is more interested is detected by using a saliency detection algorithm, and is used as a salient area, and a focus window is placed in the salient area.

Figure 16:
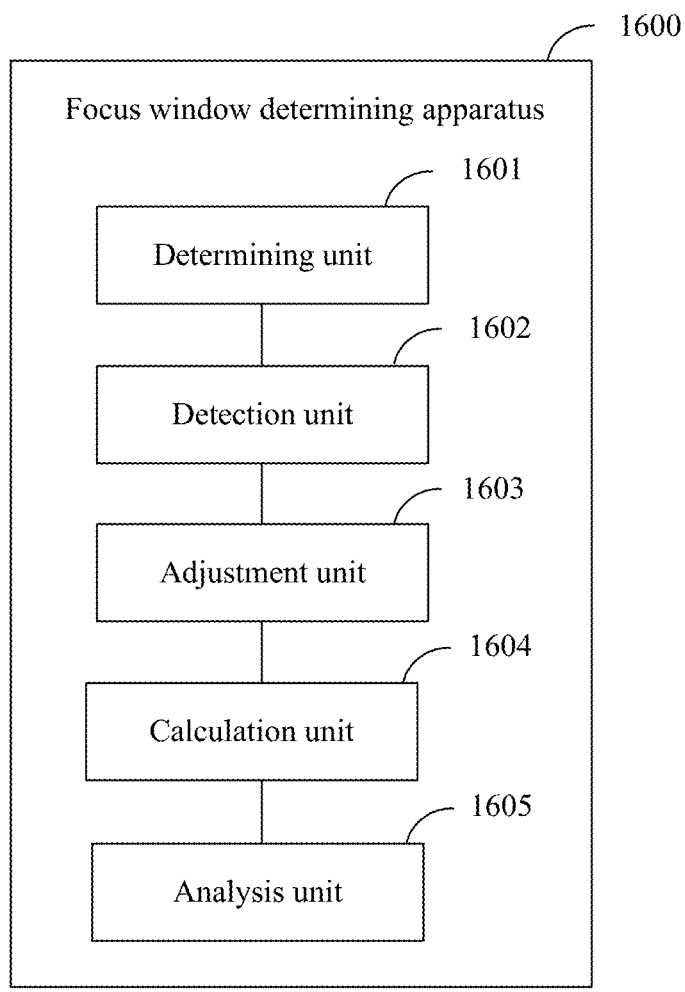
FIG. 16 is a first schematic structural diagram of a focus window determining apparatus according to an embodiment of the present invention.

Referring to FIG. 16, an embodiment of the present invention provides a focus window determining apparatus 1600. The apparatus includes:

a determining unit 1601, configured to: when a face is detected in a to-be-photographed image, determine to use a face area as a current focus window;

a detection unit 1602, configured to: detect a preset location in the face area, and adjust a width of the current focus window according to the preset location in the face area;

an adjustment unit 1603, configured to stretch a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window;

a calculation unit 1604, configured to calculate at least a contrast value of an image in the first focus window and a contrast value of an image in the second focus window; and an analysis unit 1605, configured to determine a final focus window according to the at least two contrast values.

Optionally, when detecting the preset location in the face area, and adjusting the width of the current focus window according to the preset location in the face area, the detection unit 1602 is specifically configured to:

detect locations of eyes or locations of eyebrows in the face area, and adjust the width of the current focus window to a distance between the eyes or a distance between the eyebrows in the face area.

Optionally, when determining the final focus window according to the at least two contrast values, the analysis unit 1605 is specifically configured to: use a focus window corresponding to a largest contrast value as the final focus window according to the at least two contrast values.

Figure 17:
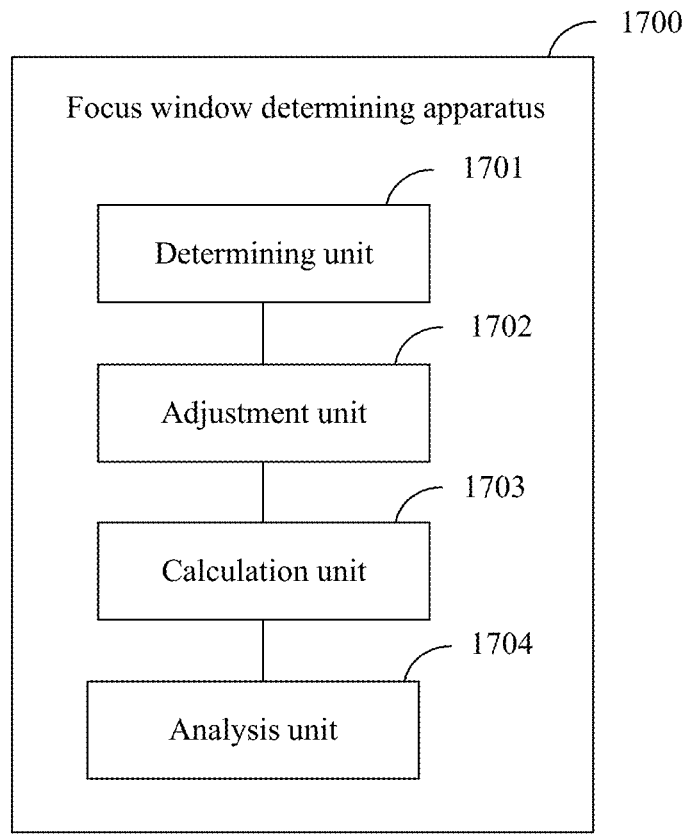
FIG. 17 is a second schematic structural diagram of a focus window determining apparatus according to an embodiment of the present invention.

Referring to FIG. 17, an embodiment of the present invention provides a focus window determining apparatus 1700. The apparatus includes:

a determining unit 1701, configured to determine that an image in a current focus window is a flat area, where the flat area means that a contrast value of the image in the current focus window is less than a first threshold;

an adjustment unit 1702, configured to enlarge the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window;

a calculation unit 1703, configured to calculate at least a contrast value of an image in the first focus window and a contrast value of an image in the second focus window; and an analysis unit 1704, configured to determine a final focus window according to the at least two contrast values.

Optionally, when determining the final focus window according to the at least two contrast values, the analysis unit 1704 is specifically configured to:

use a focus window corresponding to a largest contrast value as the final focus window according to the at least two contrast values; or use a focus window whose contrast value is greater than a second threshold and that is corresponding to a smallest preset ratio as the final focus window according to the at least two contrast values, where the second threshold is greater than the first threshold.

Figure 18:
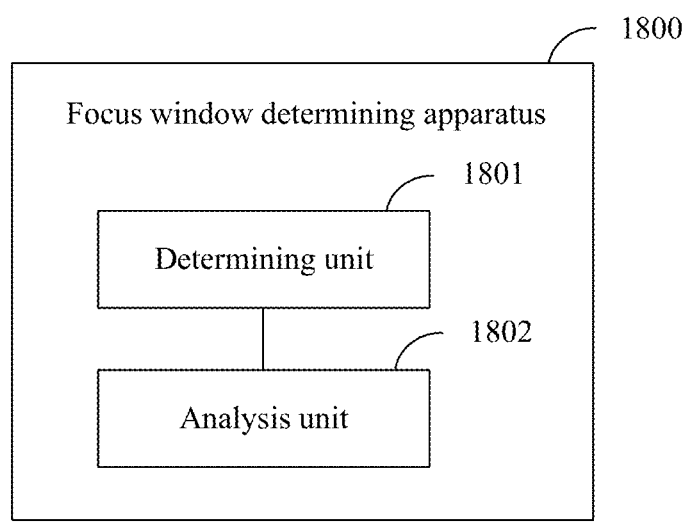
FIG. 18 is a third schematic structural diagram of a focus window determining apparatus according to an embodiment of the present invention.

Referring to FIG. 18, an embodiment of the present invention provides a focus window determining apparatus 1800. The apparatus includes:

a determining unit 1801, configured to: determine that a photographing mode used by a camera to photograph a to-be-photographed image is a macro mode, and enable dual focus windows, where the dual focus windows include a first focus window and a second focus window, a size of the second focus window is less than a size of the first focus window, and the second focus window is in the first focus window; and an analysis unit 1802, configured to: when it is determined, in a moving process of a motor of the camera, that a contrast value of an image in the first focus window decreases from a first peak value and a contrast value of an image in the second focus window decreases from a second peak value, use the first focus window as a final focus window, where the first peak value is a peak value in a contrast curve corresponding to the image in the first focus window, and the second peak value is a peak value in a contrast curve corresponding to the image in the second focus window.

It should be noted that module division in the embodiments of the present invention is an example, and is merely logical function division, and there may be other division in actual implementation. In addition, functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 19:
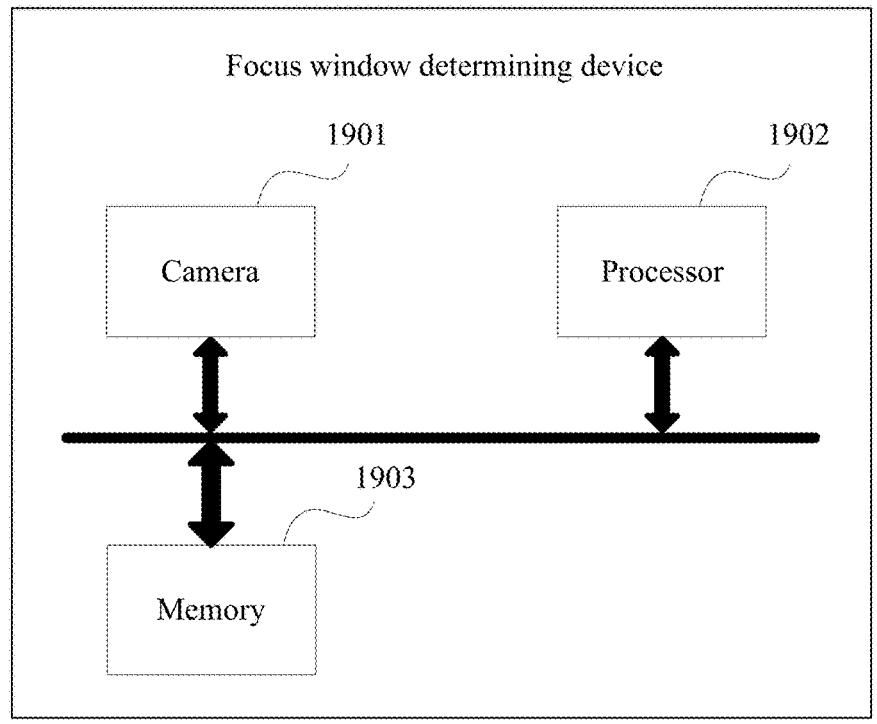
FIG. 19 is a first schematic structural diagram of a focus window determining device according to an embodiment of the present invention.

Referring to FIG. 19, an embodiment of the present invention provides a focus window determining device. The device includes a camera 1901, a processor 1902, and a memory 1903, and the camera 1901, the processor 1902, and the memory 1903 are connected by using a bus.

The memory 1903 is configured to store program code to be executed by the processor.

The processor 1902 is configured to perform the following operations by using the program code in the memory: when a face is detected in a to-be-photographed image, determining to use a face area as a current focus window; detecting a preset location in the face area, and adjusting a width of the current focus window according to the preset location in the face area; stretching a length of the current focus window according to at least a first preset ratio and a second preset ratio, where a focus window obtained after stretching the length of the current focus window according to the first preset ratio is a first focus window, and a focus window obtained after stretching the length of the current focus window according to the second preset ratio is a second focus window; calculating at least a contrast value of an image in the first focus window and a contrast value of an image in the second focus window; and determining a final focus window according to the at least two contrast values.

Optionally, when detecting the preset location in the face area, and adjusting the width of the current focus window according to the preset location in the face area, the processor 1902 is configured to perform the following operations by using the program code in the memory:

detecting locations of eyes or locations of eyebrows in the face area, and adjusting the width of the current focus window to a distance between the eyes or a distance between the eyebrows in the face area.

Optionally, when determining the final focus window according to the at least two contrast values, the processor 1902 is configured to perform the following operation by using the program code in the memory:

using a focus window corresponding to a largest contrast value as the final focus window according to the at least two contrast values.

Figure 20:
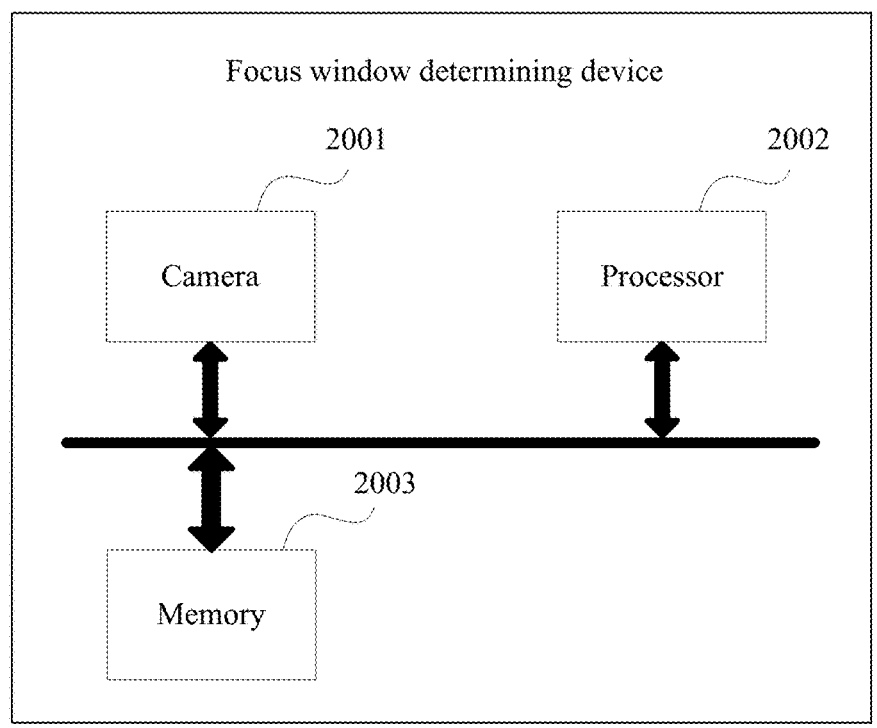
FIG. 20 is a second schematic structural diagram of a focus window determining device according to an embodiment of the present invention.

Referring to FIG. 20, an embodiment of the present invention provides a focus window determining device. The device includes a camera 2001, a processor 2002, and a memory 2003, and the camera 2001, the processor 2002, and the memory 2003 are connected by using a bus.

The memory 2003 is configured to store program code to be executed by the processor.

The processor 2002 is configured to perform the following operations by using the program code in the memory: determining that an image in a current focus window is a flat area, where the flat area means that a contrast value of the image in the current focus window is less than a first threshold; enlarging the current focus window according to at least a first preset ratio and a second preset ratio, where a focus window obtained after enlarging the current focus window according to the first preset ratio is a first focus window, and a focus window obtained after enlarging the current focus window according to the second preset ratio is a second focus window; calculating at least a contrast value of an image in the first focus window and a contrast value of an image in the second focus window; and determining a final focus window according to the at least two contrast values.

Optionally, when determining the final focus window according to the at least two contrast values, the processor 2002 is configured to perform the following operation by using the program code in the memory:

using a focus window corresponding to a largest contrast value as the final focus window according to the at least two contrast values; or using a focus window whose contrast value is greater than a second threshold and that is corresponding to a smallest preset ratio as the final focus window according to the at least two contrast values, where the second threshold is greater than the first threshold.

Figure 21:
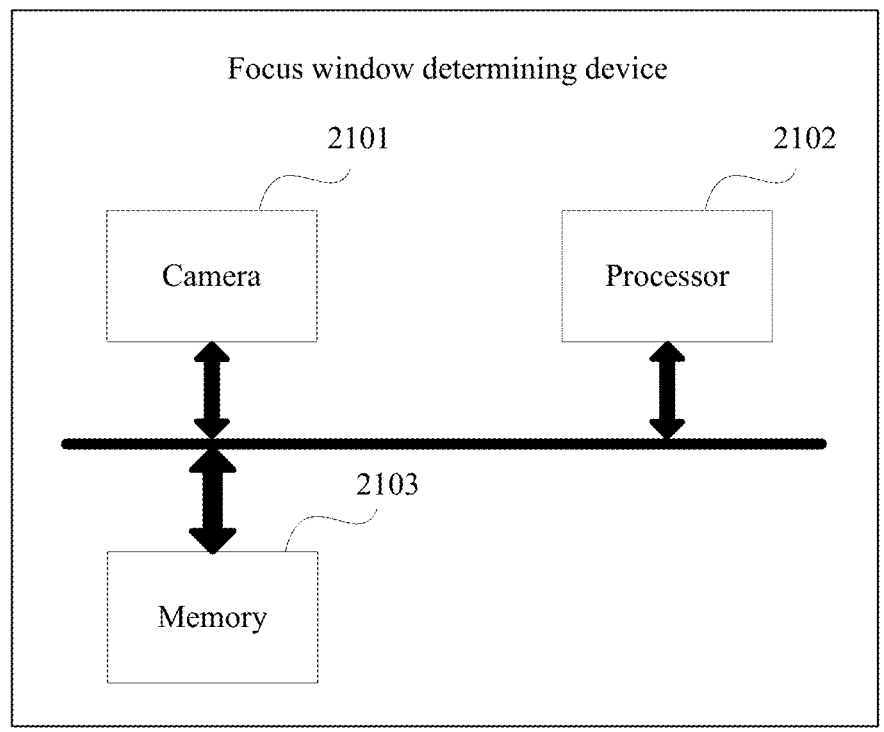
FIG. 21 is a third schematic structural diagram of a focus window determining device according to an embodiment of the present invention.

Referring to FIG. 21, an embodiment of the present invention provides a focus window determining device. The device includes a camera 2101, a processor 2102, and a memory 2103, and the camera 2101, the processor 2102, and the memory 2103 are connected by using a bus.

The memory 2103 is configured to store program code to be executed by the processor.

The processor 2102 is configured to perform the following operations by using the program code in the memory: determining that a photographing mode used by a camera to photograph a to-be-photographed image is a macro mode, and enabling dual focus windows, where the dual focus windows include a first focus window and a second focus window, a size of the second focus window is less than a size of the first focus window, and the second focus window is in the first focus window; and when it is determined, in a moving process of a motor of the camera, that a contrast value of an image in the first focus window decreases from a first peak value and a contrast value of an image in the second focus window decreases from a second peak value, using the first focus window as a final focus window, where the first peak value is a peak value in a contrast curve corresponding to the image in the first focus window, and the second peak value is a peak value in a contrast curve corresponding to the image in the second focus window.

The bus in the embodiments of the present invention is represented by thick lines in FIG. 19, FIG. 20, and FIG. 21, and a connection manner of other components is merely described by using an example, and is not limited thereto. The bus may be classified into an address bus, a data bus, a control bus, and the like. For ease of representation, only one bold line is used in FIG. 19, FIG. 20, and FIG. 21 for representation, but it does not indicate that there is only one bus or one type of bus.

The memory in the embodiments of the present invention is configured to store the program code to be executed by the processor. The memory may be a volatile memory (English: volatile memory) such as a random access memory (English: random-access memory, RAM for short), or may be a non-volatile memory (English: non-volatile memory) such as a read-only memory (English: read-only memory, ROM for short), a flash memory (English: flash memory), a hard disk drive (English: hard disk drive, HDD for short), or a solid state disk (English: solid-state drive, SSD for short). Alternatively, the memory may be any other medium that can be used to carry or store expected program code in a command or data structure form and that can be accessed by a computer, but is not limited thereto. The memory may be a combination of the foregoing memories.

The processor in the embodiments of the present invention may be a central processing unit (English: central processing unit, CPU for short).

In addition, an embodiment of the present invention provides a computer storage medium that is used to store a computer software instruction used by the foregoing focus window determining device, and the computer storage medium includes a program designed for performing the foregoing aspects.

In the embodiments of the present invention, when the face is detected in the to-be-photographed image, it is determined to use the face area as the current focus window, the preset location in the face area is detected, and the width of the current focus window is adjusted according to the preset location in the face area. Herein, the width of the focus window is reduced, so that there is no background content in the focus window. The length of the current focus window is stretched according to at least the first preset ratio and the second preset ratio. Herein, the focus window is stretched to a human body part, so that texture richness of the focus window can be improved, and further the focus effect in the face focus process is effectively improved. Finally, at least the contrast value of the image in the first focus window and the contrast value of the image in the second focus window are calculated, and the final focus window is determined according to the at least two contrast values.

In the embodiments of the present invention, it is determined that the image in the current focus window is a flat area, the current focus window is enlarged according to at least the first preset ratio and the second preset ratio, and at least the contrast value of the image in the first focus window and the contrast value of the image in the second focus window are calculated. Herein, the focus window is enlarged until the focus window includes sufficient texture areas, so that a focus effect can be improved. Finally, the final focus window is determined according to the at least two contrast values.

In the embodiments of the present invention, it is determined that the photographing mode used by the camera to photograph the to-be-photographed image is the macro mode, and the dual focus windows are enabled; and when it is determined, in the moving process of the motor of the camera, that the contrast value of the image in the first focus window decreases from the first peak value and the contrast value of the image in the second focus window decreases from the second peak value, the first focus window is used as the final focus window, so that out-of-focus caused when the focus window includes objects of different depths of field can be effectively avoided.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A focus window setting method, comprising:
    setting a face area as a current focus window when a face is detected in a to-be-photographed image;
    detecting a preset location in the face area;
    adjusting a width of the current focus window according to the preset location the face area;
    stretching a length of the current focus window according to at least one of a first preset ratio or a second preset ratio, a focus window obtained after stretching the length of the current focus window according to the first preset ratio comprising a first focus window, and a focus window obtained after stretching the length of the current focus window according to the second preset ratio comprising a second focus window;
    calculating at least one of a contrast value of an image in the first focus window or a contrast value of an image in the second focus window; and
    setting a final focus window according to at least one of two contrast values.

2. The method of claim 1, wherein detecting the preset location in the face area and adjusting the width of the current focus window comprises:
    detecting locations of eyes in the face area; and
    adjusting the width of the current focus window to a distance between the eyes in the face area.

3. The method of claim 1, wherein setting the final focus window comprises setting a focus window corresponding to a largest contrast value as the final focus window.

4. The method of claim 1, wherein detecting the preset location in the face area and adjusting the width of the current focus window comprises:
    detecting locations of eyebrows in the face area; and
    adjusting the width of the current focus window to a distance between the eyebrows in the face area.

5. A focus window setting method, comprising:
    determining that an image in a current focus window comprises a flat area, the flat area comprising a contrast value of the image in the current focus window is less than a first threshold;
    enlarging the current focus window according to at least one of a first preset ratio or a second preset ratio, a focus window obtained after enlarging the current focus window according to the first preset ratio comprising a first focus window, and a focus window obtained after enlarging the current focus window according to the second preset ratio comprising a second focus window;
    calculating at least one of a contrast value of an image in the first focus window or a contrast value of an image in the second focus window; and
    setting a final focus window according to at least one of two contrast values.

6. The method of claim 5, wherein setting the final focus window comprises setting a focus window corresponding to a largest contrast value as the final focus window.

7. The method of claim 5, wherein setting the final focus window comprises setting a focus window whose contrast value is greater than a second threshold corresponding to a smallest preset ratio as the final focus window, and the second threshold being greater than the first threshold.

8. A focus window setting method, comprising:
    determining that a photographing mode used by a camera to photograph a to-be-photographed image comprises a macro mode;
    enabling dual focus windows, the dual focus windows comprising a first focus window and a second focus window, a size of the second focus window being less than a size of the first focus window, and the second focus window is in the first focus window; and
    setting the first focus window as a final focus window when, in a moving process of a motor of the camera, a contrast value of an image in the first focus window decreases from a first peak value and a contrast value of an image in the second focus window decreases from a second peak value, the first peak value comprising a peak value in a contrast curve corresponding to the image in the first focus window, and the second peak value comprising a peak value in a contrast curve corresponding to the image in the second focus window.

\* \* \* \* \*